(12) United States Patent
Van Casteren et al.

(10) Patent No.: US 6,515,432 B2
(45) Date of Patent: Feb. 4, 2003

(54) CIRCUIT DEVICE

(75) Inventors: Dolf Henricus Jozef Van Casteren, Eindhoven (NL); Oscar Jan Deurloo, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/940,046

(22) Filed: Aug. 27, 2001

(65) Prior Publication Data

US 2002/0047599 A1 Apr. 25, 2002

(30) Foreign Application Priority Data

Aug. 28, 2000 (EP) .............................. 00202968

(51) Int. Cl.[7] .............................. H05B 37/02
(52) U.S. Cl. ...................... 315/224; 315/307
(58) Field of Search ........................ 315/224, 247, 315/291, 307, 175, 176, 219, 151, 149, 152, 388, 312

(56) References Cited

U.S. PATENT DOCUMENTS 5,170,099 A * 12/1992 Ueoka et al. ............... 315/291
5,828,178 A    10/1998 York et al. .................. 315/151
5,982,110 A *  11/1999 Gradzki ...................... 315/247

* cited by examiner

*Primary Examiner*—Don Wong
*Assistant Examiner*—James Clinger

(57) ABSTRACT

A circuit for operating a high-pressure discharge lamp with successive current periods, which circuit is provided with means for operating the connected lamp by means of a dimming signal Ds from a first state to a second state, which circuit is further provided with:

- input terminals for connecting the circuit to a power supply source,
- output terminals for connecting the lamp to be operated,
- a switch-mode power supply (smps) having a converter with a semiconductor switch for generating a converter output voltage across buffer capacitor means having a capacitance, and
- a control circuit for generating a control signal which is intended to control the switch and depends on the dimming signal.

The circuit is provided with means for adjusting the capacitance of the buffer capacitor means.

4 Claims, 2 Drawing Sheets

CIRCUIT DEVICE

BACKGROUND OF THE INVENTION

The invention relates to a circuit device for operating a high-pressure discharge lamp with successive current phases, which circuit device is provided with means for operating the connected lamp by means of a dimming signal Ds from a first state to a second state, which circuit device is provided with:

input terminals for connecting the circuit device to a power supply source, output terminals for connecting the lamp to be operated, a switch-mode power supply (smps) with a converter provided with a semiconductor switch for generating a converter output voltage across buffer capacitor means having a capacitance, and a control circuit for generating a control signal in dependence upon the dimming signal for controlling the switch.

A circuit device of the type mentioned in the opening paragraph is known from U.S. Pat. No. 5,828,178. In general, high-pressure discharge lamps are operated using successive current phases of periodically alternating polarity. In a frequently applied structure of the circuit device, the converter is connected, for this purpose, to a commutator, for example, in the form of a bridge circuit.

In the known circuit device, an optical sensor is provided for detecting light generated by the lamp. This enables a control for dimming the lamp to be realized.

The known dimming system for high-pressure discharge lamps, however, has a number of serious practical drawbacks. One serious drawback relates to the use of an optical sensor. On the one hand, because in order to properly detect the light generated by the lamp, correction for ambient light is required and, on the other hand, because such a detection is very sensitive to soiling of the sensor. An additional, frequently encountered problem relates to the fact that unstable burning of the lamp occurs easily during the dimming process, which may cause the lamp to start flickering or even cease burning altogether.

SUMMARY OF THE INVENTION

It is an object of the invention to provide a measure by means of which said drawbacks are counteracted.

To achieve this, a circuit device of the type mentioned in the opening paragraph is characterized, as a circuit device in accordance with the invention, in that the circuit device is provided with means for adapting the capacitance of the buffer capacitor. Surprisingly it has been found in experiments that by adapting the capacitance of the buffer capacitor means, at least during the transition from a first state to a second state of the lamp, both extinction and unstable burning of the lamp can be effectively counteracted. Particularly when operation of the lamp from the first state to the second state corresponds to a reduction of the power consumed by the lamp, it has been found that adaptation of the capacitance of the buffer capacitor means corresponding to a reduction of the capacitance is very effective in precluding unstable burning of the lamp or even extinction of the lamp.

Preferably, the capacitance of the buffer capacitor means is adapted in that the capacitance is built up of two or more electrically parallel-connected capacitors which can be individually switched off by means of a switch. The invention can particularly suitably be used in cases where the lamp is a metal halide lamp provided with a discharge vessel having a ceramic wall. The term "ceramic wall" is to be taken to mean in the claims, a wall of a densely sintered metal oxide, such as aluminum oxide and YAG, and of densely sintered metal nitride, such as AlN, said wall being light-transmitting over at least a part of its surface.

BRIEF DESCRIPTION OF THE DRAWING

These and other aspects of the invention will be apparent from and elucidated with reference to the embodiment(s) described hereinafter.

In the drawing.

DESCRIPTION OF THE PREFERRED EMBODIMENT

Figure 1:
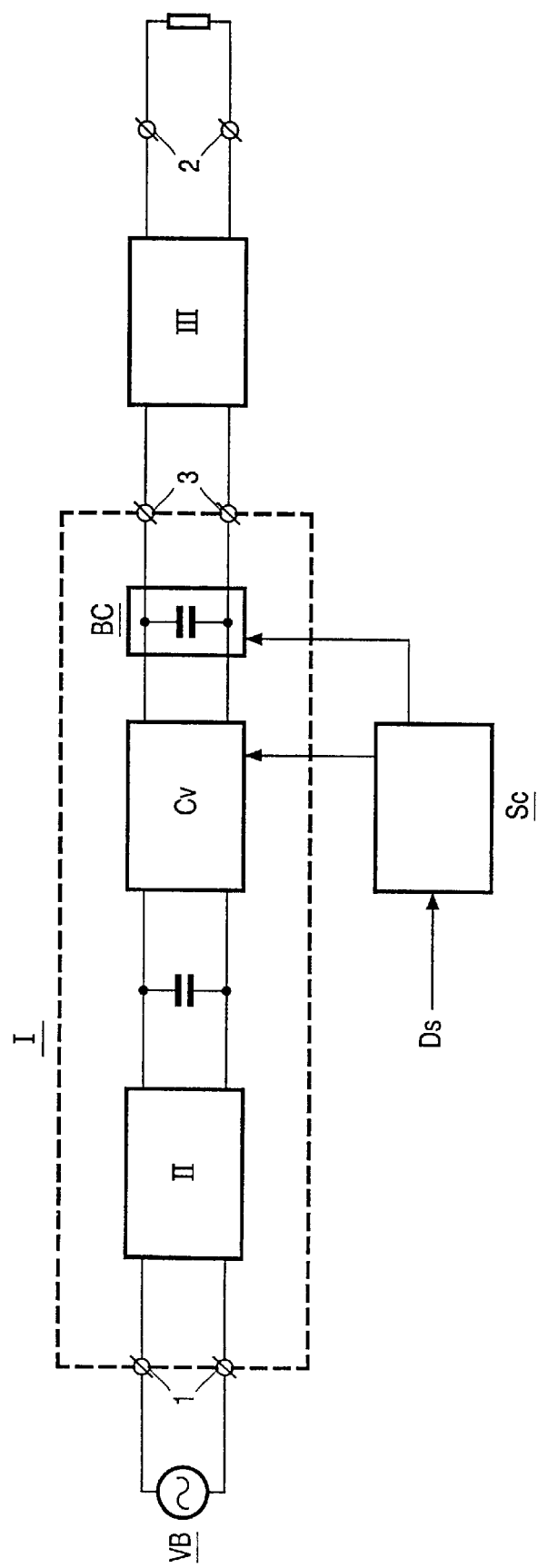
FIG. 1 shows a circuit device in accordance with the invention.

FIG. 1 shows a circuit device for operating a high-pressure discharge lamp La with successive current phases, which circuit device is provided with means for operating the connected lamp by means of a dimming signal Ds from a first state to a second state, which circuit device is further provided with:

input terminals 1 for connecting the circuit device to a power supply source VB, output terminals 2 for connecting the lamp La to be operated, a switch-mode power supply I (smps) with a converter Cv provided with a semiconductor switch for generating a converter output voltage across buffer capacitor means BC having a capacitance Cbc, and a control circuit Sc for generating a control signal in dependence upon the dimming signal for controlling the switch.

The smps I has the buffer capacitor means BC at an output 3. The output of the smps is connected to a commutator III in the form of a bridge circuit. The commutator also includes an ignition circuit which is known per se. The smps is often provided with a preconditioner II. The control circuit Sc of the circuit device is also provided with means for adapting the capacitance Cbc of the buffer capacitor means BC.

Figure 2:
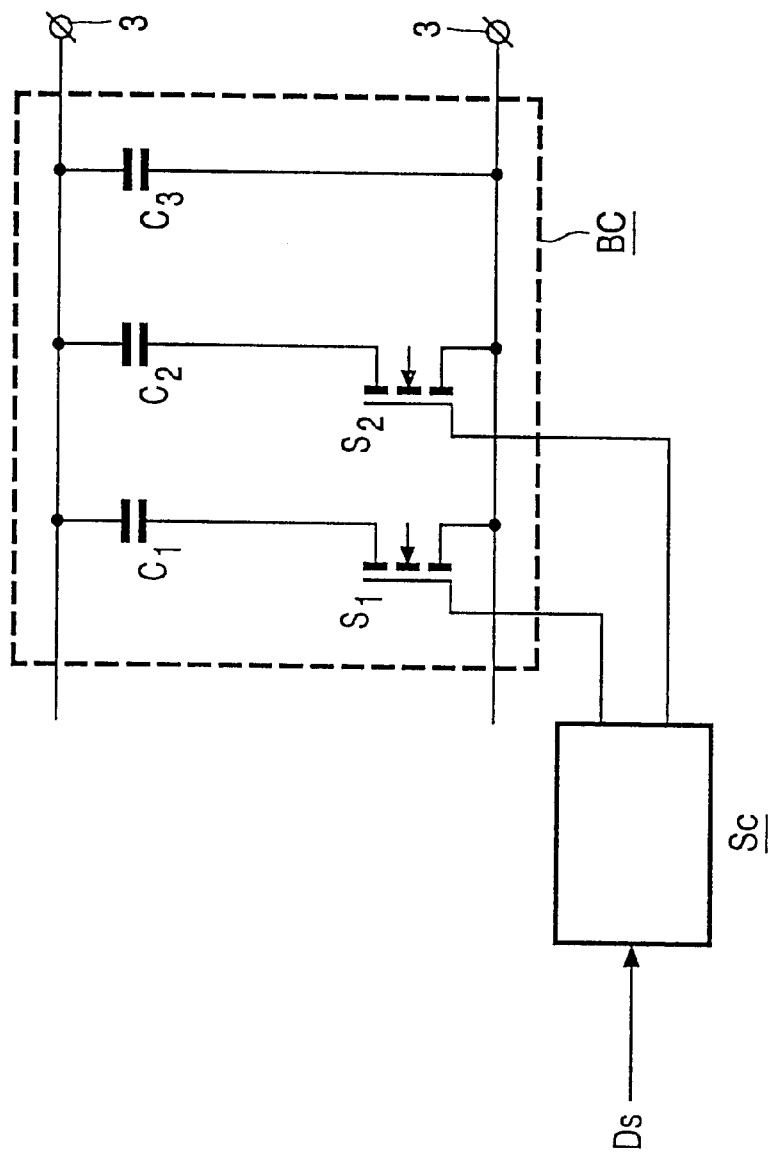
FIG. 2 shows a diagram of a part of the circuit device in accordance with FIG. 1.

In a practical embodiment of the circuit device in accordance with the invention, the circuit device can suitably be connected to a power supply source of 220 V, 50 Hz, so as to operate a CDM type metal halide lamp, manufactured by Philips, having a rated power of 70 W. The lamp is provided with a discharge vessel having a ceramic wall. The circuit device comprises a smps built up of a combination, which is known per se, of a preconditioner in the form of a (step-)upconverter or boost converter and a Buck type converter or (step-)downconverter Cv. The downconverter has buffer capacitor means BC at its output 3. FIG. 2 shows the structure of the buffer capacitor means BC in greater detail. The buffer capacitor means comprise three electrically parallel-connected capacitors C1, C2, C3. The capacitors C1 and C2 can each be switched off by means of a switch S1 and S2, respectively. It is thus achieved that the capacitance Cbc of the buffer capacitor means can be adapted. The switches S1 and S2 are rendered conducting and non-conducting by means of switching signals originating from the control circuit Sc. The switching signals are formed by means of the dimming signal Ds.

In the example described herein, the maximum value of the capacitance Cbc of the buffer capacitor means BC is 947 nF. This value is suitable for operating the lamp from a first state to a second state wherein the power consumed by the lamp lies in a range from 73 W to 55 W. If the power consumed by the lamp in the second state lies in the range between 55 W and 45 W, then the capacitance of the buffer capacitor means is adapted by switching off capacitor C1. This corresponds to a reduction of the capacitance Cbc to 267 nF. If the power consumed by the lamp in the second state decreases to a value ranging from 45 W to 35 W, then a further reduction of the capacitance Cbc takes place by switching off the capacitor C2. In said condition, the resultant capacitance Cbc of the buffer capacitor means is 47 nF.

The output of the downconverter is connected to a commutator III in the form of a bridge circuit. The commutator also comprises an ignition circuit which is known per se.

When the CDM lamp is operated in conjunction with the above-described circuit device, said lamp reaches its nominal operating state after ignition and heating up. When the lamp is subsequently dimmed from the nominal operating state to a second state, it is found that, for all power consumption levels chosen as the second state, the lamp burns without instabilities.

What is claimed is:

1. A circuit device for operating a high-pressure discharge lamp with successive current phases, which circuit device is provided with means for operating the connected lamp by means of a dimming signal Ds from a first state to a second state, which circuit device is provided with:

input terminals for connecting the circuit device to a power supply source, output terminals for connecting the lamp to be operated, a switch-mode power supply (smps) with a converter provided with a semiconductor switch for generating a converter output voltage across buffer capacitor means having a capacitance, and a control circuit for generating a control signal in dependence upon the dimming signal for controlling the switch, characterized in that the circuit device is provided with means for adapting the capacitance of the buffer capacitor means.

2. A circuit device as claimed in claim 1, characterized in that operation of the lamp from the first state to the second state corresponds to a reduction of the power consumed by the lamp, and in that the adaptation of the capacitance of the buffer capacitor means corresponds to a reduction of the capacitance.

3. A circuit device as claimed in claim 1, characterized in that adaptation of the capacitance of the buffer capacitor means takes place in that the capacitance is built up of two or more electrically parallel-connected capacitors which can be individually switched off by means of a switch.

4. A circuit device as claimed in claim 1, characterized in that t he lamp is a metal halide lamp provided with a discharge vessel having a ceramic wall.

* * * * *